(12) United States Patent
Pan et al.

(10) Patent No.: US 8,382,358 B2
(45) Date of Patent: Feb. 26, 2013

(54) DOUBLE-SIDE DISPLAY PANEL WITH BACKLIGHT MODULE USED THEREIN AND MANUFACTURE METHOD THEREOF

(75) Inventors: Chih-Liang Pan, Hsin-Chu (TW); Ching-Feng Chen, Hsin-Chu (TW); Han-Chang Cheng, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 403 days.

(21) Appl. No.: 12/860,138

(22) Filed: Aug. 20, 2010

(65) Prior Publication Data

US 2011/0128722 A1  Jun. 2, 2011

(30) Foreign Application Priority Data

Nov. 27, 2009  (TW) .............................. 98140688 A

(51) Int. Cl.
G02F 1/13357 (2006.01)
(52) U.S. Cl. ......... 362/612; 362/97.1; 362/97.2; 362/27
(58) Field of Classification Search .................... 362/27, 362/97.1, 97.2, 611, 612, 561, 631, 632; 349/61
See application file for complete search history.

(56) References Cited

U.S. PATENT DOCUMENTS

| 6,883,934 B2 * | 4/2005 | Kawakami et al. ........... 362/261 |
| 2009/0066687 A1 | 3/2009 | Oke et al. | |
| 2010/0053506 A1 * | 3/2010 | Bae et al. ........................ 349/69 |

FOREIGN PATENT DOCUMENTS

| CN | 1687830 A | 10/2005 |
| JP | 2002231033 A | 8/2002 |
| JP | 2003036715 A | 2/2003 |
| JP | 2004341408 A | 12/2004 |
| JP | 2005165081 A | 6/2005 |
| JP | 2008209818 A | 9/2008 |
| JP | 2009031618 A | 2/2009 |
| WO | 2006027883 A1 | 3/2006 |

OTHER PUBLICATIONS

English translation of abstract of CN 1687830A.
China Office Action dated Oct. 27, 2010.
English translation of abstract of JP2005165081A.
English translation of abstract of JP2009031618A.
English translation of abstract of JP2008209818A.
English translation of abstract of JP2002231033A.

(Continued)

*Primary Examiner* — Karabi Guharay
(74) *Attorney, Agent, or Firm* — McClure, Qualey & Rodack, LLP

(57) ABSTRACT

A backlight module and a display device using the same are provided. The display device further includes a first panel and a second panel disposed on opposite sides of the backlight module. The backlight module has a light module and a back plate with a through hole formed on it. The light module includes a flexible circuit board having a first strip and a second strip. A plurality of first light sources and second light sources are respectively disposed on the first strip and the second strip. The flexible circuit board passes through the through hole, and the first strip and the second strip are on two opposite sides of the back plate. The first strip and the first light sources are distributed along a side of the first panel while a portion of the second strip is bent to extend along a side of the second strip.

22 Claims, 15 Drawing Sheets

OTHER PUBLICATIONS

English translation of abstract of WO2006027883A1.

English translation of abstract and pertinent parts of JP 2004341408A (published Dec. 2, 2004).

China Office Action dated Oct. 10, 2012.

English translation of abstract and pertinent parts of JP 2003036715A (published Feb. 7, 2003).

* cited by examiner

DOUBLE-SIDE DISPLAY PANEL WITH BACKLIGHT MODULE USED THEREIN AND MANUFACTURE METHOD THEREOF

BACKGROUND-OF THE INVENTION

1. Field of the Invention

The present invention relates to a backlight module and a display device using the backlight module, and more particularly, to a backlight module capable of cooperating with a plurality of display panels and a display device using the backlight module.

2. Description of the Prior Art

As the electronics market becomes increasingly competitive, the design of various electronic products also becomes more diversified. In addition to improvements in functional design, the product appearance and user interface design are also important design issues. In the design of electronic products, the use of display panel has become an important part. The display panel can not only provide the displaying function, but also become a user interface for communicating with the user. Furthermore, there is also considerable space to use display panel for the design of product appearance.

Conventionally, a single display panel is usually disposed on the electronic products to be a displaying interface. No matter mobile phones, laptop computers, personal digital assistants, a single display panel is used to display images. However, with the diversity of design, two display panels are used in some electronic products to provide different display information. For example, a main display panel and a sub display panel are disposed on two sides of a mobile phone respectively, the main display panel can show a main control screen or provide functions of playing films and photos, while the sub display panel can be an interface of providing coming call display and media playing information.

FIG. 1 shows a scheme diagram of a conventional display structure or device using two display panels. As shown in FIG. 1, a larger main light guide plate 11 and a smaller sub light guide plate 12 are disposed on two opposite sides of the back plate 30 of the backlight module. A main LED light strip 51 is disposed around or adjacent to the main light guide plate 11; a sub LED light strip 52 is disposed around or adjacent to the sub light guide plate 12. A main display panel 71 and a sub display panel 72 are disposed outside the main light guide plate 11 and the sub light guide plate 12 respectively. Lights emitted from the main LED light strip 51 are guided by the main light guide plate 11 to uniformly provide images to the main display panel 71 to display; lights emitted from the sub LED light strip 52 are guided by the sub light guide plate 12 to uniformly provide images to the sub display panel 72 to display.

In the above-mentioned conventional designs, in order to cooperate with the main light guide plate 11 and the sub light guide plate 12 disposed on two sides of the back plate 30, the separated main LED light strip 51 and sub LED light strip 52 must be used, therefore, the overall increase in the number of parts during assembly, resulting in the burden on the assembly process and time.

SUMMARY OF THE INVENTION

A scope of the invention is to provide a backlight module and a display device having a function of double-side displaying.

A scope of the invention is to provide a backlight module and a display device having fewer backlight module components.

A scope of the invention is to provide a backlight module and a display device having an easier assembling process.

A scope of the invention is to provide a method of manufacturing a backlight module and a display device which can increase the assembly convenience or lower the cost.

The display device includes a backlight module, a first panel, and a second panel. The first panel and the second panel are disposed on two opposite surfaces corresponding to the backlight module respectively. The first panel and the second panel receive the back light generated from the backlight module respectively, and display images toward the direction back opposite to the backlight module. The backlight module includes a back plate and a light source module, wherein the back plate has a first surface and a second surface, the first surface and the second surface are opposite and face outward respectively. The first surface faces toward the first panel and the second surface faces toward the second panel. A through hole is also formed on the back plate from the first surface to the second surface.

The light source module mainly includes a strip flexible circuit board, a plurality of first light sources, and a plurality of second light sources. The strip flexible circuit board has a first strip and a second strip connecting to the first strip; the first light source is disposed on the first strip, and the second light source is disposed on the second strip. The strip flexible circuit board is inserted into the through hole of the back plate, so that the first strip and the second strip are located on two sides of the back plate and extend along the first surface and the second surface. The first strip and the first light sources disposed on it are correspondingly distributed along a side of the first panel. The bent portion of the second strip and the second light sources disposed on it are correspondingly distributed along a side of the second panel. With the disposition of the first strip and the second strip, the light sources needed for the first panel and the second panel to display images can be provided respectively.

The backlight module manufacturing method includes steps of: forming a through hole on a back plate from a first surface to a second surface of the back plate; preparing a strip flexible circuit board having a first strip and a second strip connecting to the first strip; disposing a plurality of first light sources on the first strip and disposing a plurality of second light sources on the second strip; passing the strip flexible circuit board through the through hole, so that the first strip and the second strip extending along the first surface and the second surface respectively.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

The invention provides a backlight module and a method of manufacturing the backlight module. In addition, the invention also provides a display device using the backlight module. In a preferred embodiment, the display device of the invention can be a LCD device including a home LCD television, a LCD monitor of a PC and a notebook, a LCD panel of a mobile phone and a digital camera.

Figure 1:
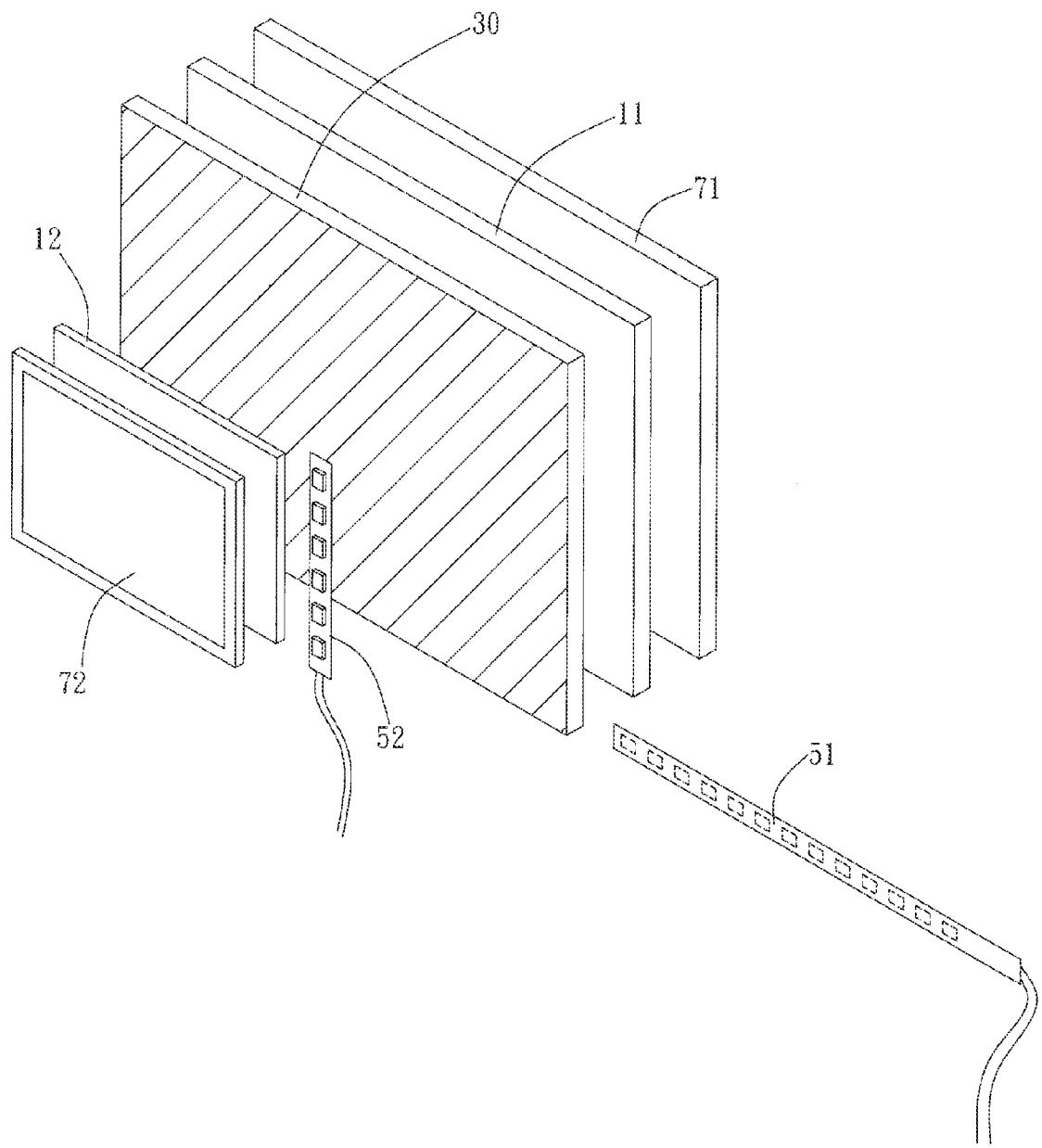
FIG. 1 illustrates a scheme diagram of a conventional structure using two display panels.
Figure 2:
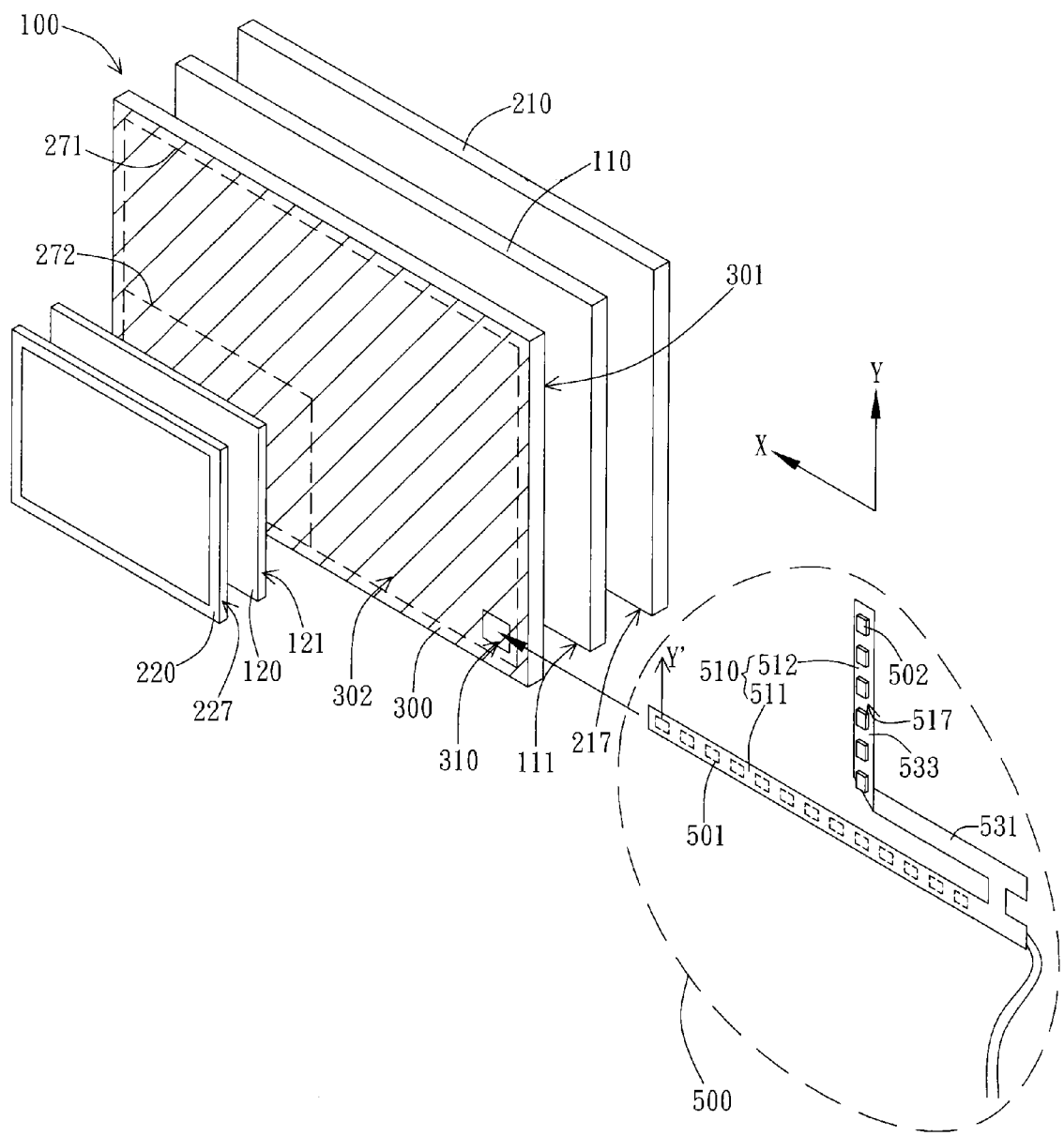
FIG. 2 illustrates an exploded diagram of an embodiment of the display device in the invention.

As shown in FIG. 2, the display device includes a backlight module 100, a first panel 210, and a second panel 220. The first panel 210 and the second panel 220 are disposed on two opposite surfaces of the backlight module 100 respectively. In a preferred embodiment, the first panel 210 and the second panel 220 are both LCD panel. In addition, as shown in FIG. 2, it is better that the area of the first panel 210 is larger than that of the second panel 220, therefore, a covered region 272 of the second panel 220 is included in a covered region 271 of the first panel 210. The first panel 210 and the second panel 220 receive lights generated from the backlight module 100 respectively, and show images in directions toward and backward the backlight module 100 respectively.

The backlight module 100 includes a back plate 300 and a light source module 500. As shown in FIG. 2, the back plate 300 has a first surface 301 and a second surface 302, and the first surface 301 and the second surface 302 are opposite and face outward respectively. The first surface 301 faces toward the first panel 210, and the second surface 302 faces toward the second panel 220. In a preferred embodiment, the back plate 300 can have a part of hollow region to reduce its weight, however, the strength and support of its structure should be also considered. As shown in FIG. 2, a through hole 310 is formed on the back plate 300 and penetrates from the first surface 301 to the second surface 302. It is better that the through hole 310 is disposed near the edge and the corner of the back plate 300, but the through hole 310 can be also disposed on any other position of the back plate 300. It is better that the through hole 310 is a complete hole with a closed edge, but it can be also an open concave with a non-closed edge at the back plate 300 end, such as a penetrated gap.

Figure 3A:
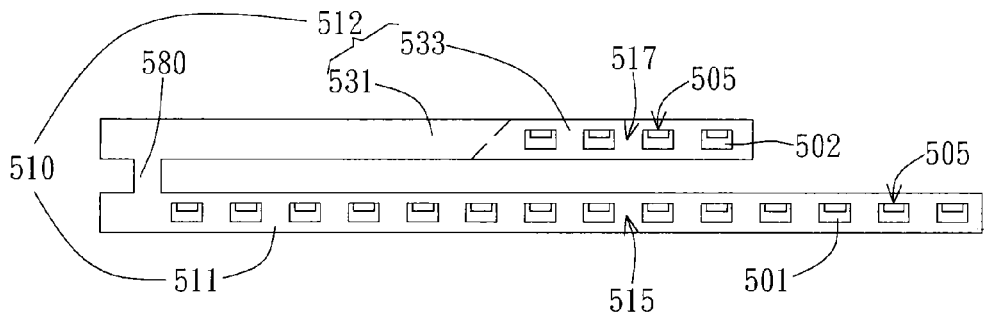
FIG. 3A illustrates a scheme diagram of an embodiment of the light source module.
Figure 3B:
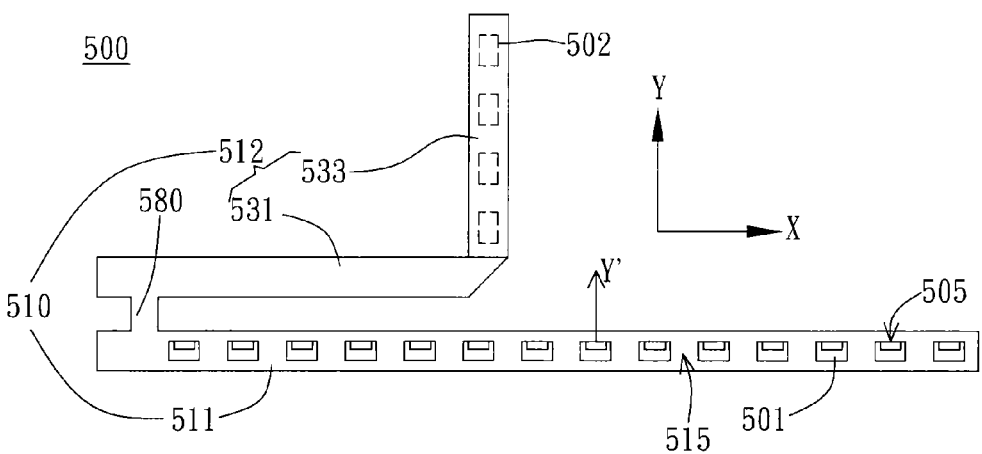
FIG. 3B illustrates a scheme diagram of bending the embodiment shown in FIG. 3A.
Figure 4A:
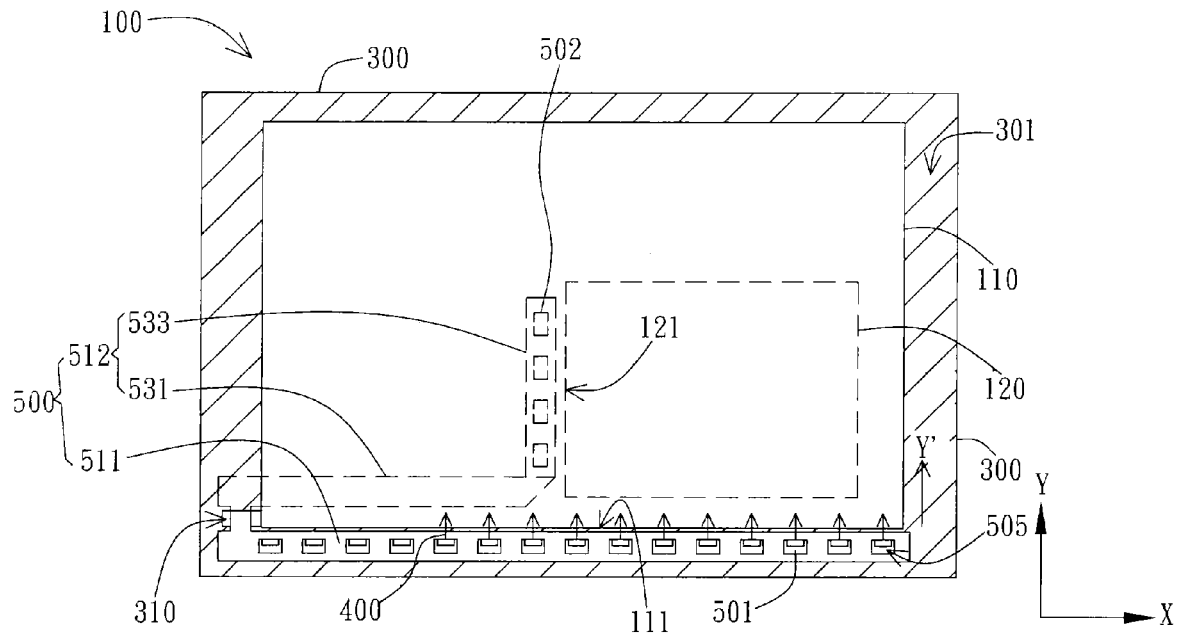
FIG. 4A illustrates a scheme diagram of the first surface of the backlight module after being assembled.
Figure 4B:
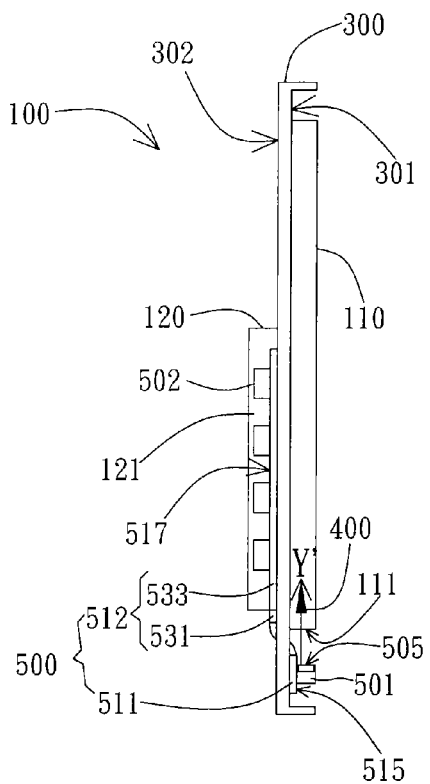
FIG. 4B illustrates a side view of the embodiment shown in FIG. 4A.

The light source module 500 mainly includes a strip flexible circuit board, a plurality of first light sources 501, and a plurality of second light sources 502. As shown in FIG. 2, FIG. 3A, and FIG. 3B, the strip flexible circuit board 510 has a first strip 511 and a second strip 512 connecting to the first strip 511. The first light sources 501 are disposed on the first strip 511, and the second light sources 502 are disposed on the second strip 512. In a preferred embodiment, the first light sources 501 and the second light sources 501 are LED; however, in different embodiments, they can be other types of lighting units. The strip flexible circuit board 510 is inserted into the through hole 310 of the back plate 300, so that the first strip 511 and the second strip 512 are disposed on two sides of the back plate 300 respectively, and the first strip 511 and the second strip 512 extend along a first direction X on the first surface 301 and along a second direction Y on the second surface 302 respectively. The first strip 511 and the first light sources 501 disposed on the first strip 511 correspond to a side 217 of the first panel 210; that is to say, the first strip 511 and the first light sources 501 are distributed along the side 217 of the first panel 210. The bent portion of the second strip 512 and the second light sources 502 disposed on the second strip 512 correspond to a side 227 of the second panel 220; that is to say, the bent portion of the second strip 512 and the second light sources 502 are distributed along the side 227 of the second panel 220. The first strip 511 and the second strip 512 can provide the light source to the first panel 210 and the second panel 220 for displaying images. In this embodiment, the side 217 of the first panel 210 is a long side of the first panel 210, and the side 227 of the second panel 220 is a short side of the second panel 220. However, in other embodiments, the side 217 of the first panel 210 and/or the side 227 of the second panel 220 can be long side or short side respectively.

In an embodiment shown in FIG. 3A, the first strip 511 and the second strip 512 are arranged side by side, and a connecting part 580 is used to connect the first strip 511 and the second strip 512 by one end. It is better that the first strip 511 and the second strip 512 are formed by cutting the same circuit board, that is to say, it is better that the first strip 511 and the second strip 512 are formed from one object. After the second strip 512 is bent, as shown in FIG. 3B, the second strip 512 will be divided into a connecting strip 531 and a light source bearing strip 533, and an angle is formed between the connecting strip 531 and the light source bearing strip 533. The connecting strip 531 is a portion that connects to the first strip 511 via the connecting part 580 and not bent, therefore, the connecting strip 531 and the first strip 511 are still arranged side by side; the light source bearing strip 533 is bent to be vertical to the first strip 511 or to form a specific angle between the light source bearing strip 533 and the first strip 511. In this embodiment, since the second strip 512 is only bent once, therefore, before it is bent, it is better that the first light source 501 and the second light source 502 are disposed on a surface of the first strip 511 and the second strip 512 toward the same direction. After the second strip 512 is bent, the first light source 501 and the second light source 502 can be disposed toward opposite directions. In different embodiments, if the second strip 512 is designed to be bent odd times (e.g., three times or five times), the first light source 501 and the second light source 502 can be disposed on the same surface of the first strip 511 and the second strip 512 at first, so that after the second strip 512 is bent, the first light source 501 and the second light source 502 can be disposed toward opposite surfaces; if the second strip 512 is designed to be bent even times (e.g., two times or four times), the first light source 501 and the second light source 502 can be disposed on opposite surfaces of the first strip 511 and the second strip 512 at first, so that after the second strip 512 is bent, the first light source 501 and the second light source 502 can be still disposed toward opposite surfaces.

As shown in FIG. 2, FIG. 3B, FIG. 4A, and FIG. 4B, the backlight module 100 also includes a first light guide plate 110 disposed on the first surface 301 of the back plate 300. After the light source module 500 and the back plate 300 are combined, at least one portion of the first strip 511 of the light source module 500 will extend along the direction X of a side 111 of the first light guide plate 110, therefore, the first light sources 501 on the first strip 511 will be distributed along the side 111 of the first light guide plate 110. In this embodiment, the first strip 511 is parallel to the first surface 301 of the back plate 300, and also parallel to the direction X of the side 111 of the first light guide plate 110. The first light source 501 is disposed on a surface 515 of the first strip 511 opposite to the back plate 300, and the first light source 501 has a light emitting side surface 505 vertical to the surface 515 of the first strip 511. In other words, a lateral lighting design is used in the first light source 501 to make the light emitting direction Y' vertical to the extending direction X of the side 111 of the first light guide plate 110. As shown in the side view of FIG. 4B, the light emitting side surface 505 of the first light source 501 faces toward the side 111 of the first light guide plate 110, therefore, it can emit a light 400 toward the first light guide plate 110, so that the light 400 enters into the first light guide plate 110. Then, the light 400 will be guided to be uniformly distributed, and be emitted into the first panel 210 above the first light guide plate 110, as shown in FIG. 2.

As shown in FIG. 2, FIG. 3B, FIG. 5A, and FIG. 5B, the backlight module 100 further includes a second light guide plate 120 disposed on the second surface 302 of the back plate 300. The second strip 512 of the light source module 500 is extended along the second surface 302, after the light source bearing strip 533 is bent opposite to the connecting strip 531, the light source bearing strip 533 will extend along the direction Y of the side 121 of the second light guide plate 120, therefore, the second light sources 502 on the light source bearing strip 533 will be distributed along the side 121 of the second guiding plate 120. In this embodiment, the area of the second light guide plate 120 is smaller than that of the first light guide plate 110, and the second light guide plate 120 can be disposed on any position on the back plate 300, therefore, with the bendable design of the second strip 512, the light source bearing strip 533 can cooperate with the position of the second light guide plate 120 and provide light sources.

Figure 5A:
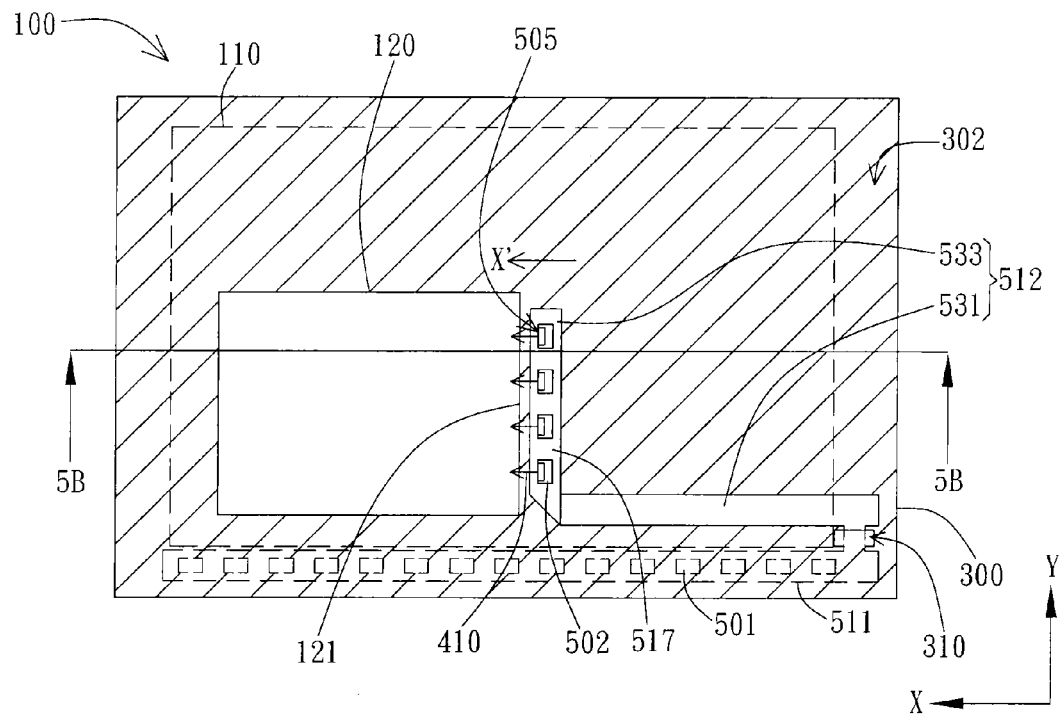
FIG. 5A illustrates a scheme diagram of the second surface of the embodiment shown in FIG. 4A.
Figure 5B:
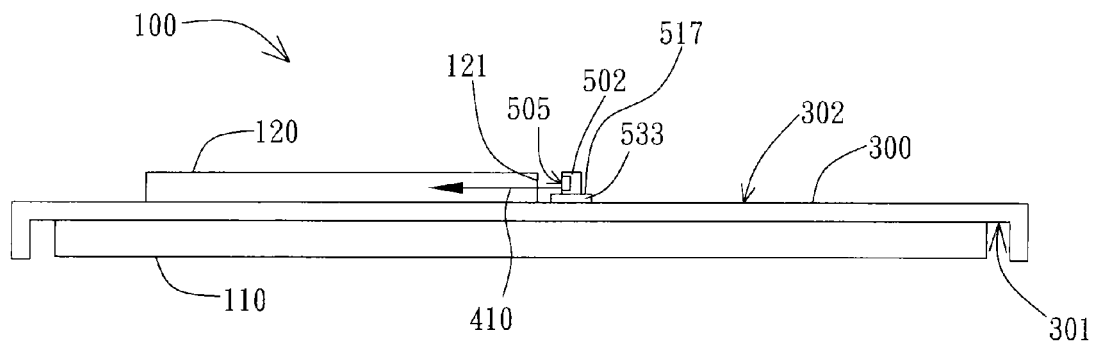
FIG. 5B illustrates a cross-sectional scheme diagram of the embodiment shown in FIG. 5A.

In the embodiment shown in FIG. 5A and FIG. 5B, the second strip 512 is parallel to the second surface 302 of the back plate 300 and also parallel to the direction Y of the side 121 of the second light guide plate 120. The second light source 502 is disposed on a surface 517 of the light source bearing strip 533 opposite to the back plate 300 after the light source bearing strip 533 is folded and reversed. The second light source 502 also has the light emitting side surface 505 vertical to the surface 517 of the light source bearing strip 533. In other words, the light emitting direction X' of the second light source 502 is parallel to the second surface 302 of the back plate 300, or vertical to the extending direction Y of the side 121 of the second light guide plate 120. As shown in FIG. 5B, the light emitting side surface 505 of the second light source 502 faces toward the side 121 of the second light guide plate 120, therefore, it can emit a light 410 toward the second light guide plate 120, so that the light 410 can be emitted into the second light guide plate 120. After the light 410 is emitted into the second light guide plate 120, it is guided to be uniformly distributed and then emitted into the second panel 229 above the second light guide plate 120, as shown in FIG. 2.

Figure 6:
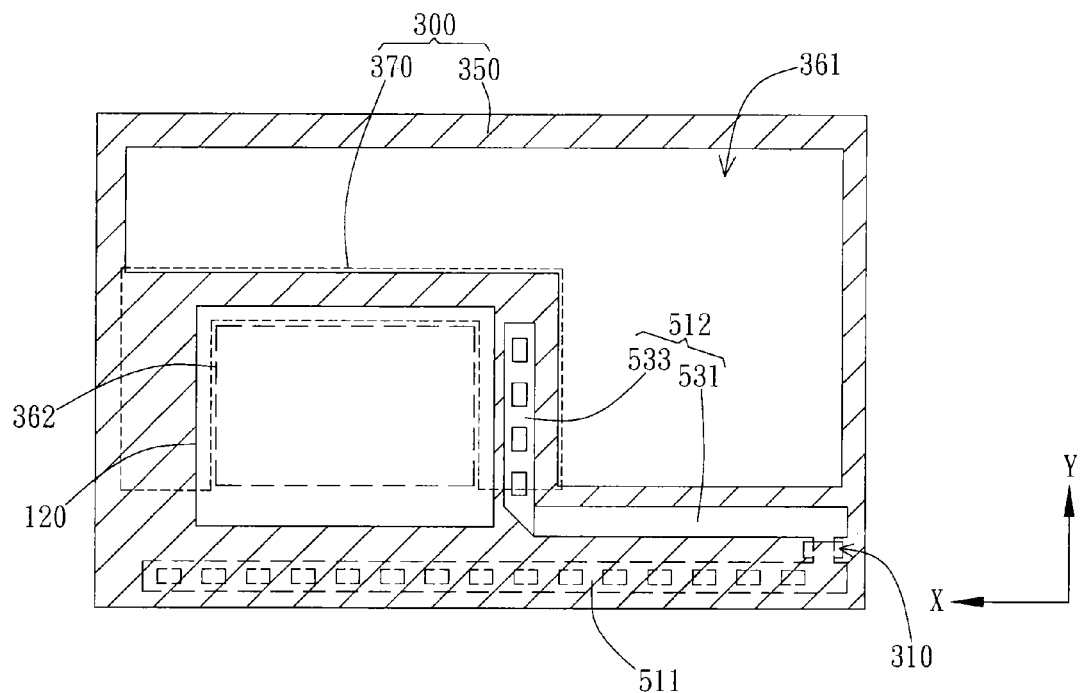
FIG. 6 illustrates a scheme diagram of the back plate with a hollow design.

As shown in FIG. 6, it is better that the back plate is designed in a hollow way. In this embodiment, the back plate 300 includes a edge frame 350 and a support frame 370; the edge frame 350 forms the main range of the back plate 300 and is a region supporting and corresponding to the first light guide plate 110; the support frame 370 is located within the edge frame 350 and connected to the edge frame 350. A first hollow region 361 and a second hollow region 362 are formed between the edge frame 350 and the support frame 370. The support frame 370 and/or a portion of the edge frame 350 is a region supporting and corresponding to the second light guide plate 120, and can fix the position of the second light guide plate 120. In this embodiment, the edge frame 350 is a rectangle frame, and the width corresponding to the first strip 511 and the connecting strip 531 is larger than that of other portions. The support frame 370 is a U-shape frame and connected to the edge frame 350, and it is better that the support frame 370 and the edge frame 350 form the back plate 300 from one object. However, in other embodiments, the edge frame 350 and the support frame 370 can be two connecting rectangle frames, or the edge frame 350 is a rectangle frame and the support frame 370 is an L-shape frame. There is no special limitation to divide the edge frame 350 and the support frame 370. As shown in FIG. 6, the connecting strip 531 and the light source bearing strip 533 of the second strip 512 extend along the edge frame 350 on the direction X and the support frame 370 on the direction Y; the connecting strip 531 is distributed along the edge frame 350 on the direction X, the bent light source bearing strip 533 is distributed along the support frame 370 (i.e., the direction Y) vertical to the edge frame 350.

Figure 7A:
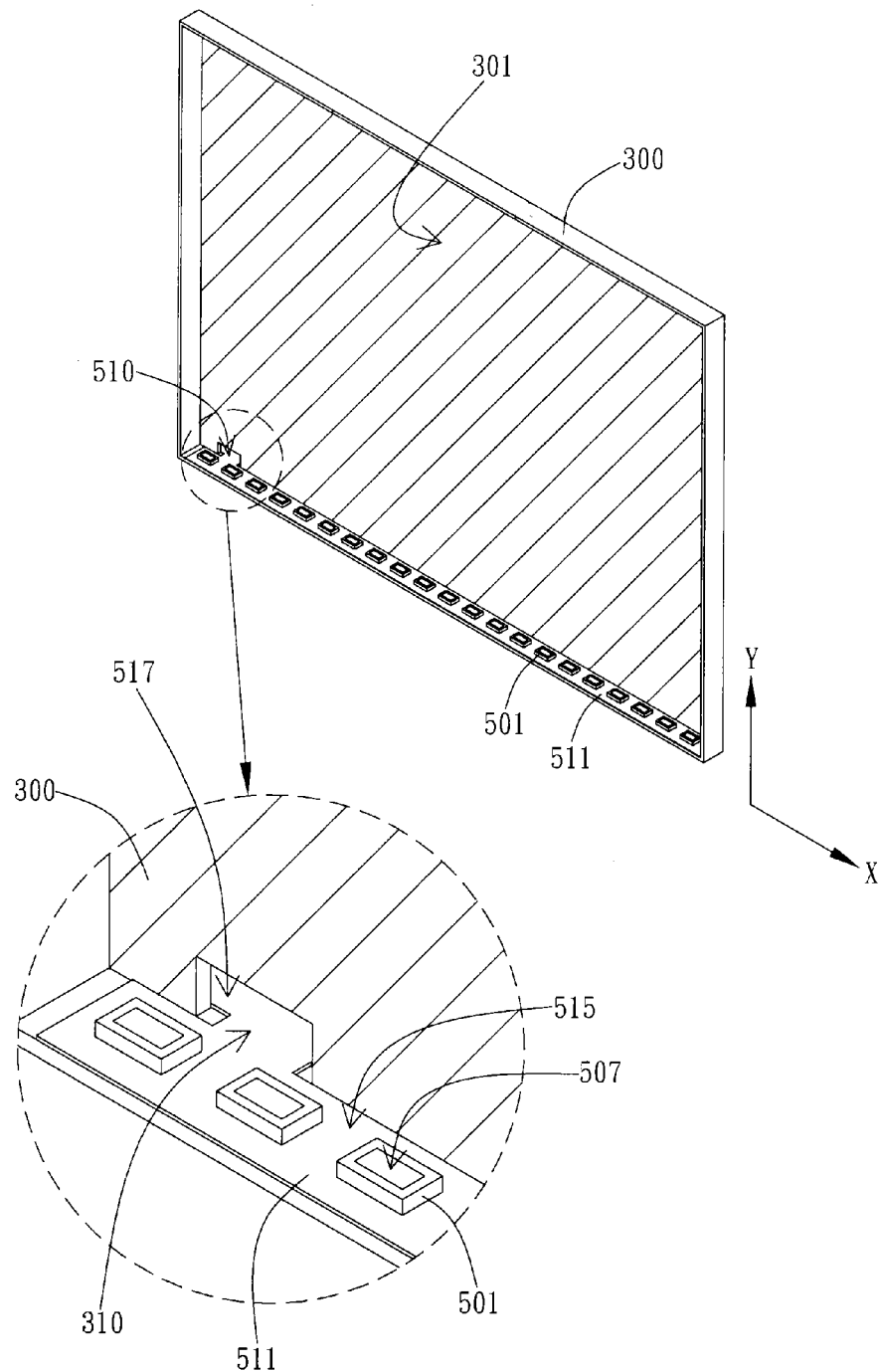
FIG. 7A illustrates a scheme diagram of another embodiment of the backlight module.
Figure 7B:
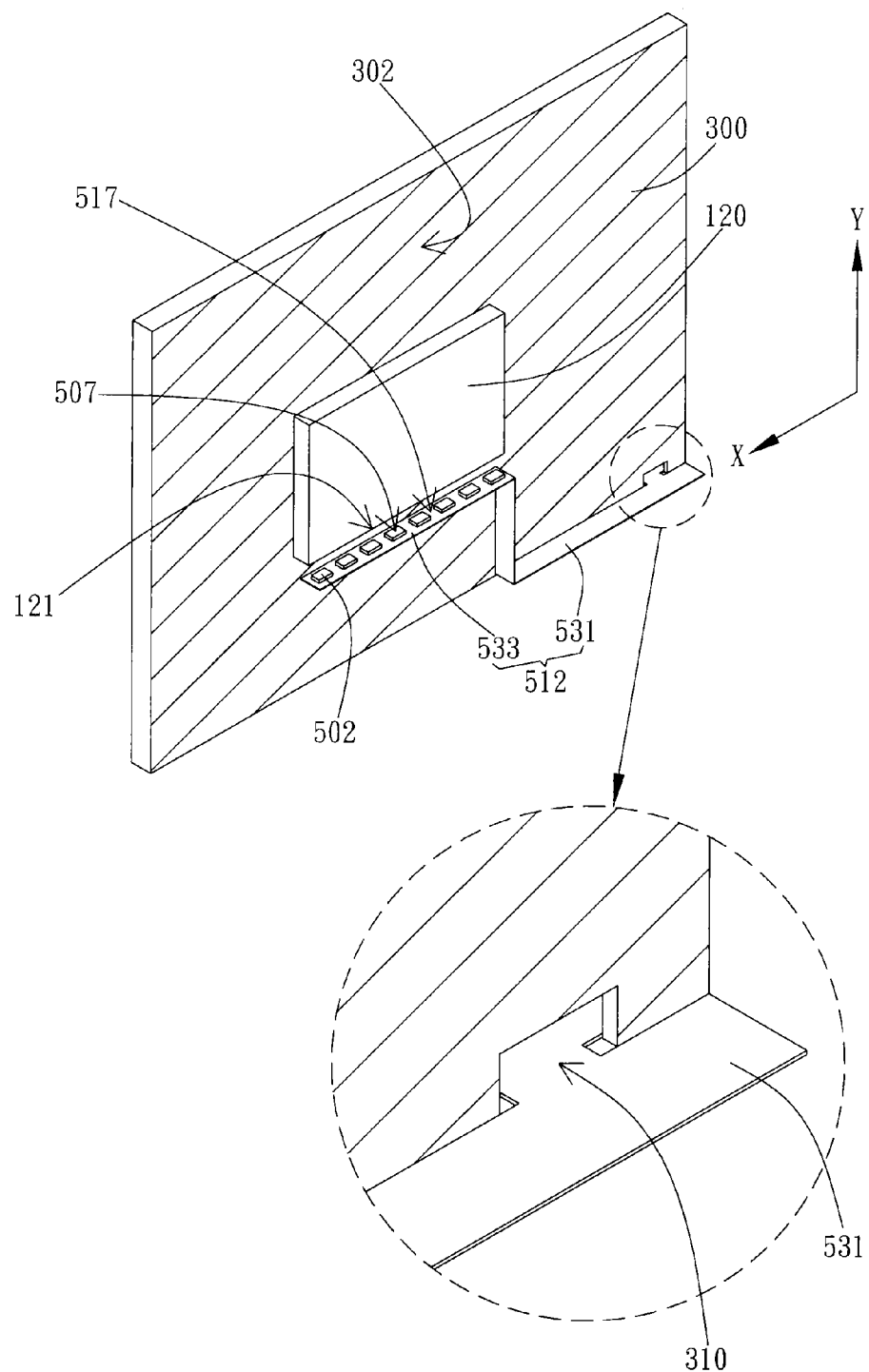
FIG. 7B illustrates a scheme diagram of another surface of the embodiment shown in FIG. 7A.

In the embodiments shown in FIG. 2, FIG. 7A, and FIG. 7B, the first light source 501 and the second light source 502 are disposed by a top lighting way; in other words, the first light source 501 and the second light source 502 both have the light emitting top surface 507 parallel to the surfaces 515 and 517 of the first strip 511 and second strip 512, and light toward the direction Y away from the first strip 511 and the second strip 512. As shown in FIG. 7A, after the strip flexible circuit board 510 extends into the though hole 310 of the back plate 300, the first strip 511 will extend along the direction X on the first surface 301 of the back plate 300. In this embodiment, the first strip 511 is vertical to the first surface 301, and the first light sources 501 disposed on the first strip 511 will light toward the direction Y parallel to the first surface 301; in other words, the light emitting top surface 507 will face toward the side 111 of the first light guide plate 110, as shown in FIG. 2.

Figure 7C:
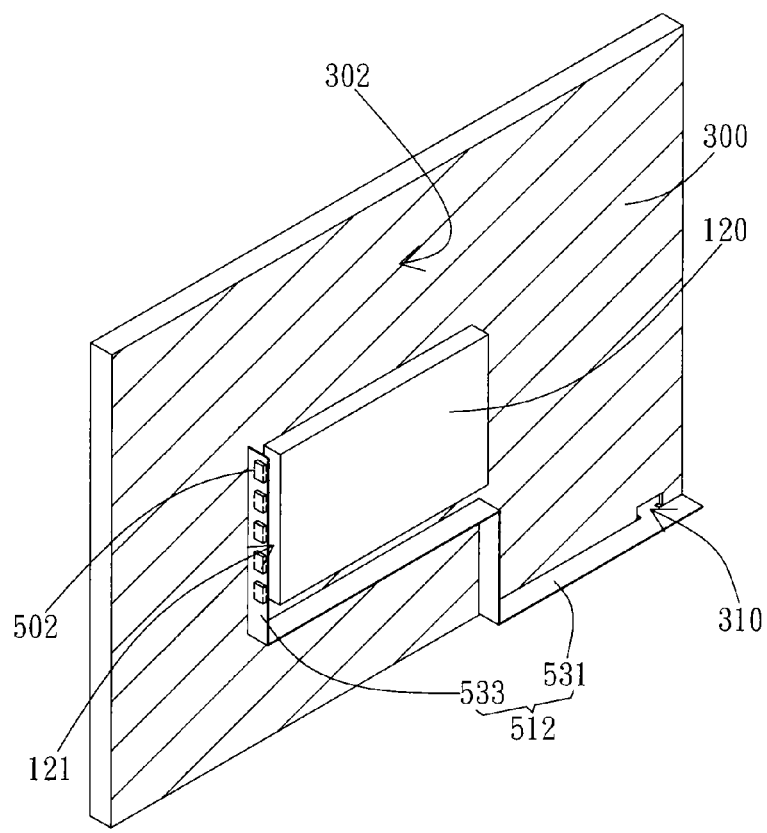
FIG. 7C illustrates a scheme diagram of another embodiment of the second strip.

As shown in FIG. 7B, the second strip 512 is vertical to the second surface 302 of the back plate 300. The connecting strip 531 and the light source bearing strip 533 are vertical to the second surface 302 respectively. The connecting strip 531 is bent once or several times from the bent portion by an axis of normal of the second surface 302 to form the light source bearing strip 533. Therefore, the connecting strip 531 and the light source bearing strip 533 can be disposed in a non-collinear or parallel way, and but still vertical to the second surface 302. In this embodiment, the connecting strip 531 is performed by 90° bending two times forward and backward, so that the light source bearing strip 533 will be parallel to the first strip 511 and non-collinear or parallel to the light source bearing strip 533. However, in different embodiments, if the second strip 512 is only bent once, then a better angle of 90° can be formed between the light source bearing strip 533 and the connecting strip 531. As shown in FIG. 7B, after the light source bearing strip 533 is bent, the light source bearing strip 533 will extend along the direction X of the side 121 of the second light guide plate 120, and the second light sources 502 disposed on the light source bearing strip 533 will light toward the side 121 of the second light guide plate 120. In other words, the light emitting top surface 507 of the second light source 502 faces toward the long side 121 of the second light guide plate 120. If the number or position of the bending on the second strip 512 is changed, then the light source bearing strip 533 can correspond to different sides of the second light guide plate 120, as the short side 121 shown in FIG. 7C.

In addition, the first light sources 501 disposed on the first strip 511 does not need to use the same light emitting direction with the second light sources 502 disposed on the second strip 512. For example, the first light source can use top lighting design and the second light source uses lateral lighting design, and vice versa. In this embodiment, the first strip 511 can use the design as shown in FIG. 7A, and the second strip 512 uses the design as shown in FIG. 5B. At this time, the only thing needs to do is to bend the connecting position between the first strip 511 and the second strip 512 to make the first strip 511 vertical to the first surface 301 of the back plate 300, and the second strip 512 parallel to the second surface 302 of the back plate 302. Similarly, the design of the first strip 511 as shown in FIG. 5A can be used to cooperate with the design of the second strip 512 as shown in FIG. 7B. That is to say, the first strip 511 is parallel to the first surface 301 of the back plate 300, and the second strip 512 is vertical to the second surface 302 of the back plate 300.

Figure 8:
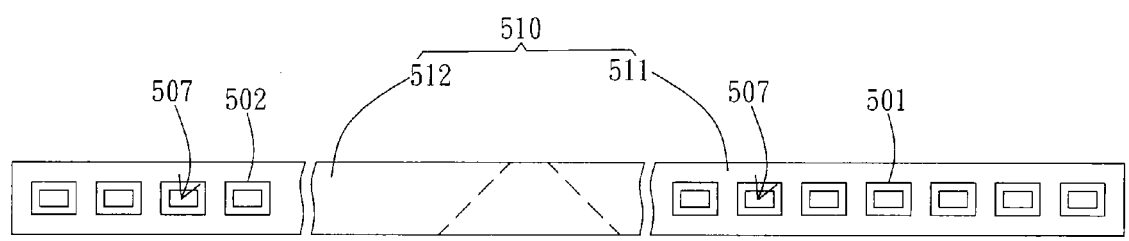
FIG. 8 illustrates a scheme diagram of another embodiment of the light source module.
Figure 9A:
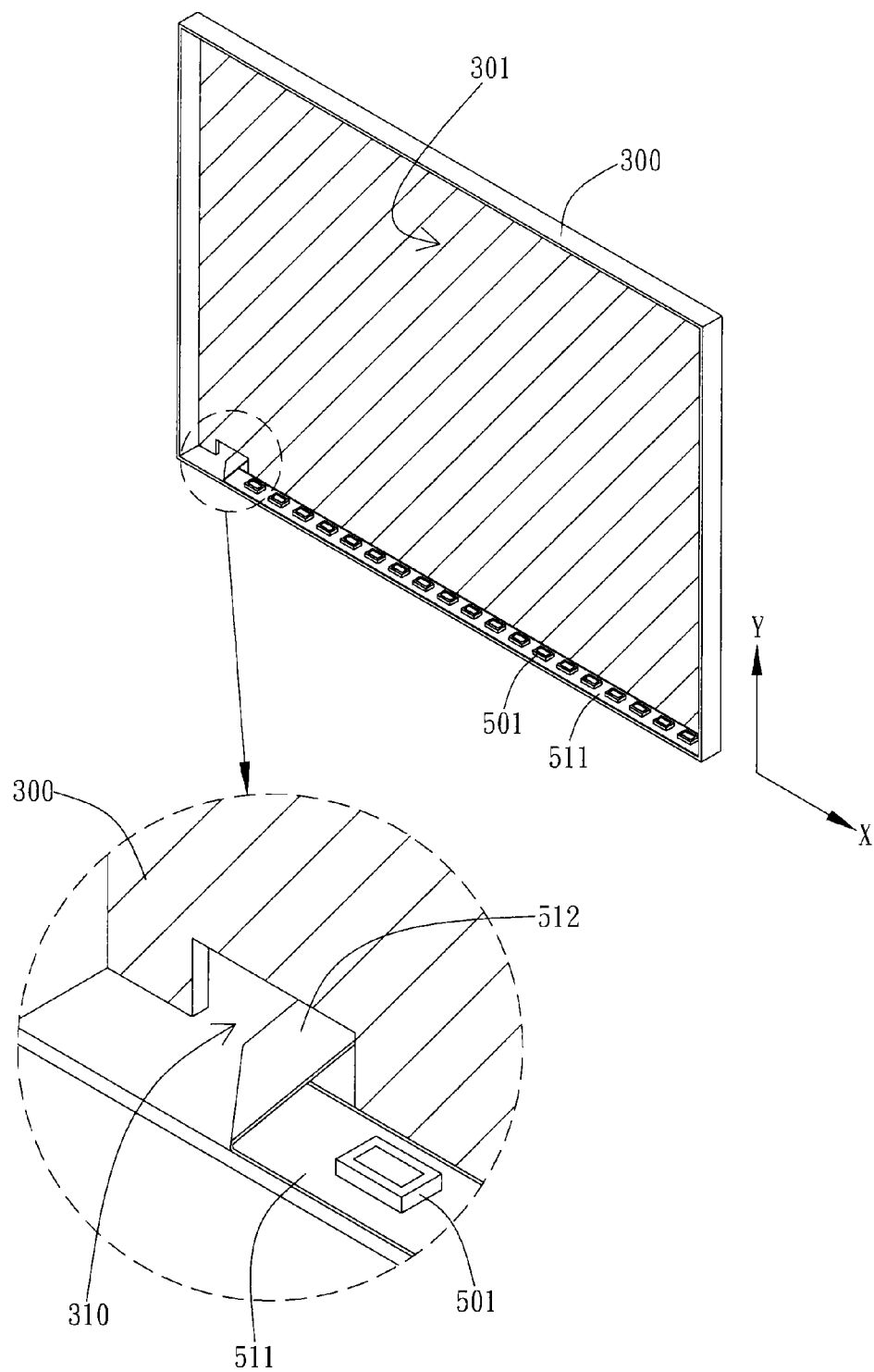
FIGS. 9A and 9B illustrate scheme diagrams of the embodiment of the light source module shown in FIG. 8.
Figure 9B:
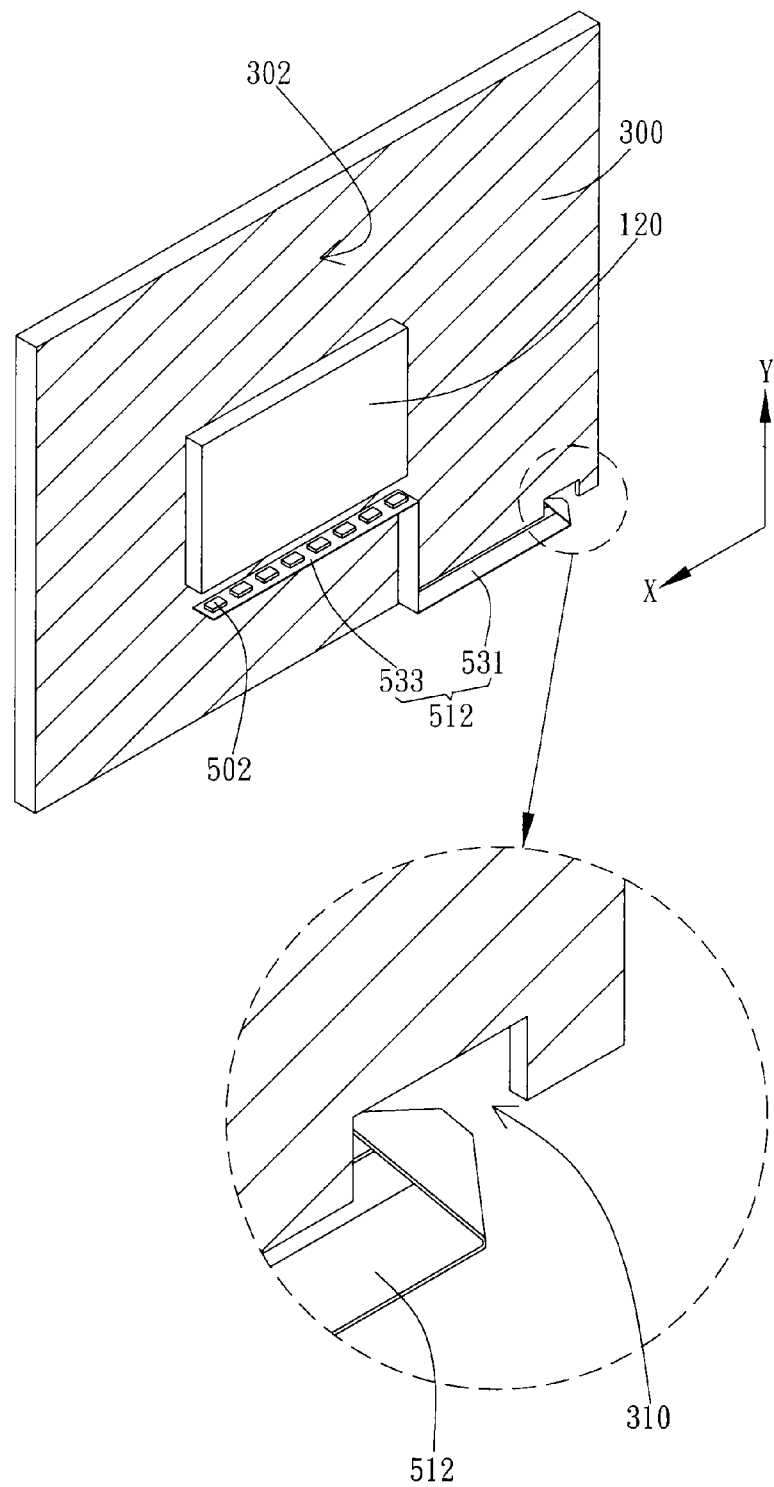

In the embodiment shown in FIG. 8, the first strip 511 and the second strip 512 of the strip flexible circuit board 510 are arranged in a line to form a strip form. The first light source 501 and the second light source 502 are formed on the first strip 511 and the second strip 512 respectively; therefore, they are also arranged in a line. As shown in FIG. 9A, after the second strip 512 passes through the through hole 310 or penetrated gap of the open concave with non-closed edge on the back plate 300, the first lateral fold will be generated on the connecting position between the first strip 511 and the second strip 512. There will be an angle of 90° between the folded second strip 512 and the first strip 511. Then, as shown in FIG. 9B, a second lateral fold will be performed on the position near the first lateral folded position to make the second strip 512 to be bent by 90° again. At this time, the second strip 512 totally rotates 180° to be reversed to the original direction, but it is parallel to the first strip 511 and they extend to the same direction X. After the strip flexible circuit board 510 is folded two times, the arrangement of the first strip 511 and the second strip 512 will be changed from the original in-line state to side-by-side state, and disposed on two sides of the back plate 300. In this embodiment, it is better to use the top lighting design for the first light source 501 and the second light source 502, and the following design and bending method used on the second strip 512 can refer to the above-mentioned embodiment.

Figure 10A:
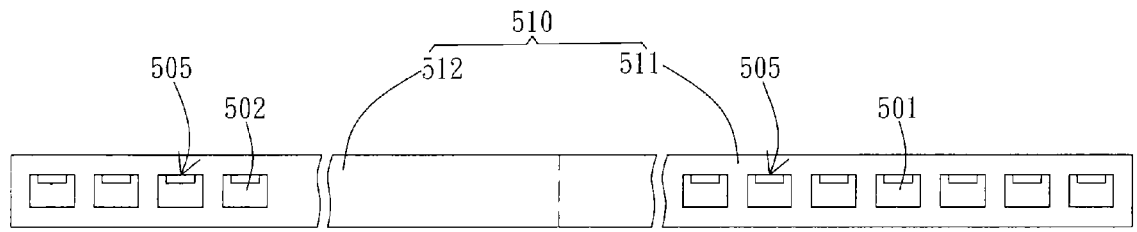
FIGS. 10A and 10B illustrate a scheme diagram of another embodiment of the light source module.
Figure 10B:
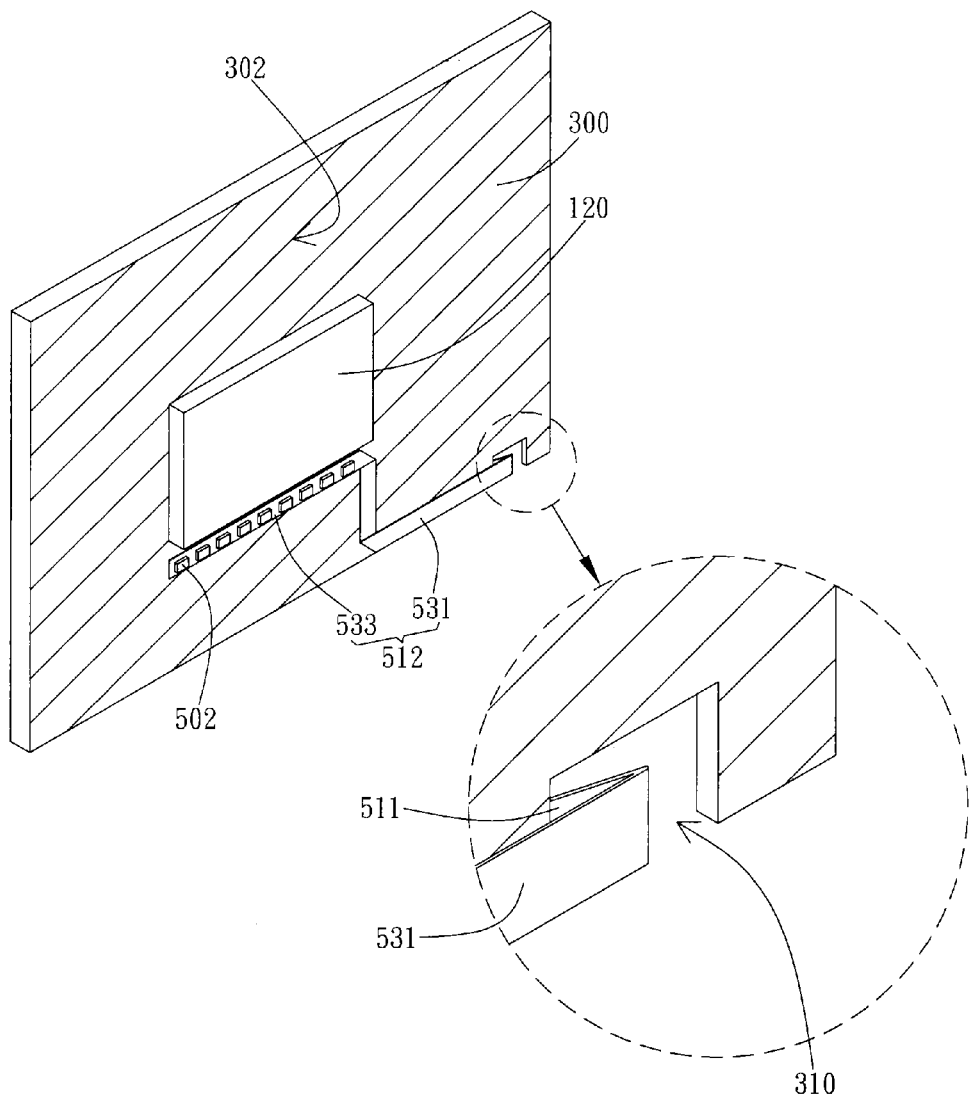

In the embodiment as shown in FIG. 10A, the first strip 511 and the second strip 512 of the strip flexible circuit board 510 are also arranged in a line to form a strip form. The first light source 501 and the second light source 502 are formed on the first strip 511 and the second strip 512 respectively; therefore, they are also arranged in a line. However, in this embodiment, the first light source 501 and the second light source 502 use the lateral lighting design. As shown in FIG. 10B, after the strip flexible circuit board 510 passes through the through hole 310 or penetrated gap of the open concave with non-closed edge on the back plate 300, the first strip 511 and the second strip 512 of the strip flexible circuit board 510 will be folded from the connecting position. The following design and bending method used on the second strip 512 can refer to the above-mentioned embodiment using odd or even times folds to change the position of the light source bearing strip 533.

Figure 11:
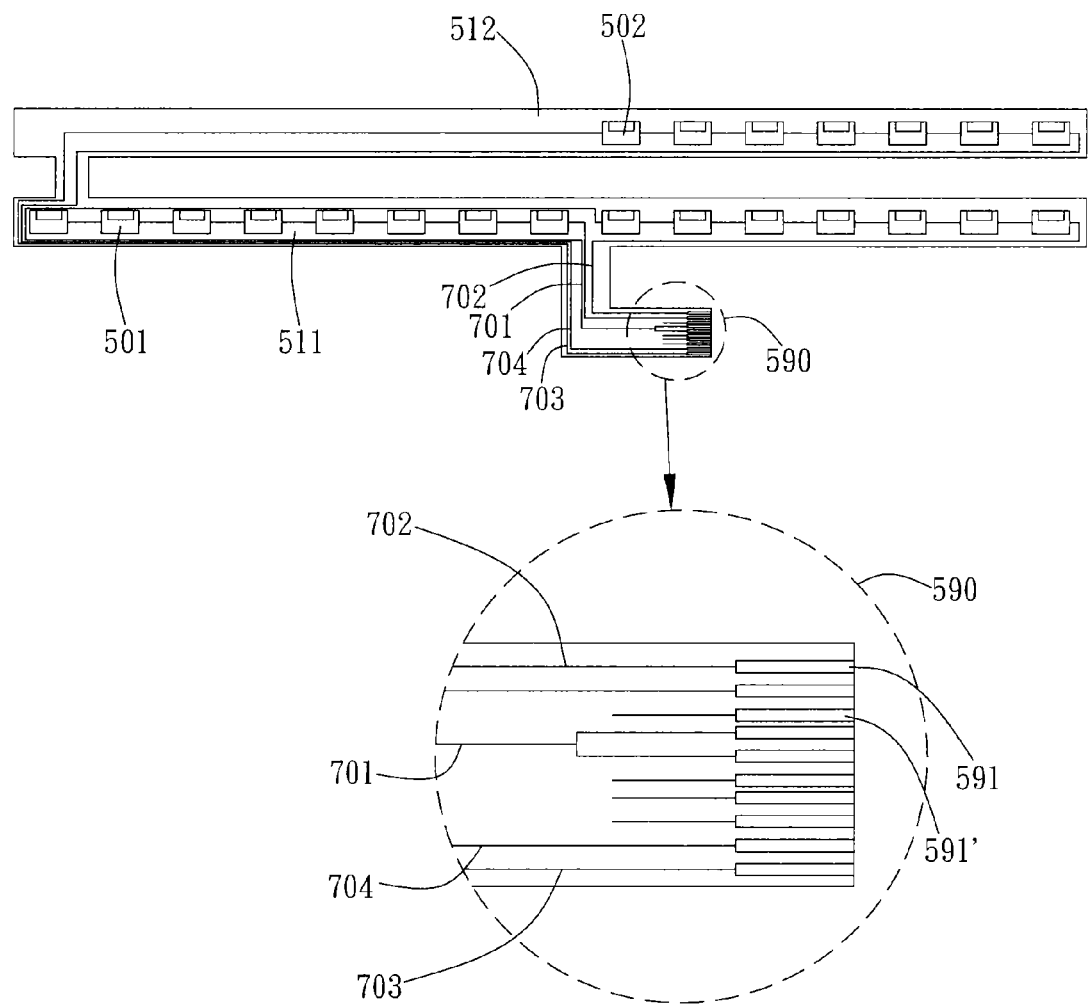
FIG. 11 illustrates a scheme diagram of the embodiment of the connector in the light source module.

As shown in FIG. 11, the light source module 500 further includes a connector 590 for connecting to the back-end control circuit or driving circuit. The connector 590 has a plurality of terminals 591 for connecting to the positive electrode line and the negative electrode line of the first light source 501 and the second light source 502. It is better for the first light source 501 to use the circuit design in series; therefore, it has one common positive electrode line and one common negative electrode line. The second light source 502 also uses the same design to have one common positive electrode line and one common negative electrode line. As shown in FIG. 11, it is better to have idle terminal 591' between the terminals 591 connecting to the positive electrode line 701 and the negative electrode line 702 of the first light source 501, that is to say, the terminals not connecting to the positive electrode line and the negative electrode line of the first light source 501 or the second light source 502 to reduce the possibility of shortage. However, in different designs, the design of no idle terminals 591' between the positive electrode line 703 and the negative electrode line 704 of the second light source 501 can be also used. In addition, in order to consider the routing convenience, it is better to dispose the positive electrode line 701 of the first light source 501 adjacent to the negative electrode line 702, and dispose the positive electrode line 703 of the first light source 502 adjacent to the negative electrode line 704.

Figure 12:
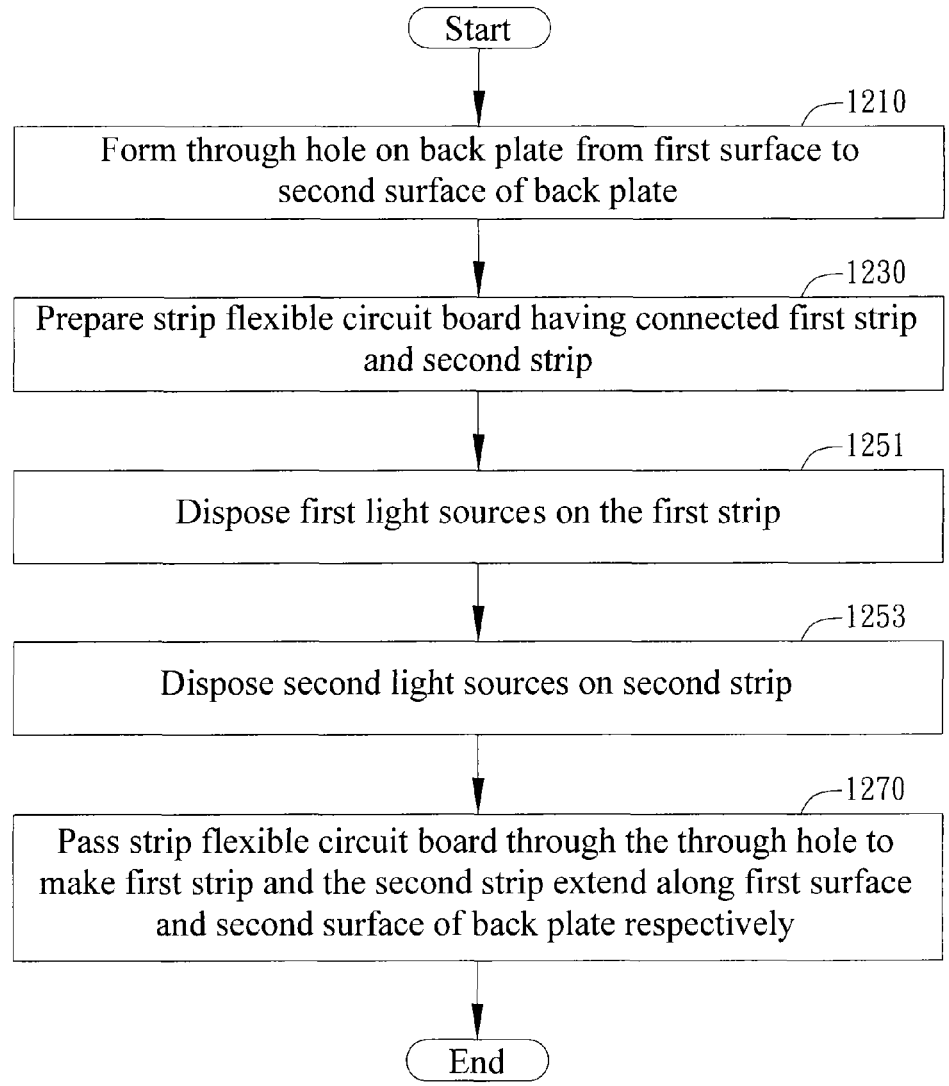
FIG. 12 illustrates a flow chart of the embodiment of the backlight module manufacturing method.

FIG. 12 shows the flow chart of the embodiment of the backlight module manufacturing method. As shown in FIG. 12, the step 1210 includes forming the through hole 310 on the back plate 300 from the first surface 301 to the second surface 302 of the back plate 300. The better methods for forming the through hole 310 include punching, forming from an object, drilling, or other processes. In addition, the through hole 310 can be a closed hole or an open concave on the side of the back plate 300 based on the needs of the design.

The step 1230 is to prepare the strip flexible circuit board 510 having the first strip 511 and the second strip 512, and the first strip 511 and the second strip 512 are connected. In a preferred embodiment, an entire soft circuit board is directly cut to generate the first strip 511 and the second strip 512. However, in different embodiments, the separated first strip 511 and the second strip 512 can be also connected to form the strip flexible circuit board 510. In addition, the first strip 511 and the second strip 512 can be arranged in line or side-by-side to match different design needs.

In a preferred embodiment, the first strip 511 and the second strip 512 are arranged side-by-side, and they are connected by one end. However, in different embodiments, the first strip 511 and the second strip 512 are arranged in a line, and head and tail are connected.

The steps 1251 and 1253 are to dispose the first light sources 501 on the first strip 511, and to dispose the second light sources 502 on the second strip 512. It is better for the first light source 501 and the second light source 502 to be disposed on the first strip 511 and the second strip 512 by using the same top lighting or lateral lighting way; but in different embodiments, they can use different designs of light emitting directions. It should be noticed that no matter the top lighting way or the lateral lighting way is used to dispose the first light source 501 and the second light source 502, it is better the light emitting direction of the first light source 501 and the second light source 502 after they are assembled is parallel to the first surface 301 and the second surface 302 of the back plate 300.

The step 1270 includes passing the strip flexible circuit board 510 through the through hole 310, so that the first strip 511 and the second strip 512 will extend along the first surface 301 and the second surface 302 of the back plate 300 respectively. With this configuration, the first light source 501 and the second light source 502 can be distributed along the first surface 301 and the second surface 302. If the backlight module includes the first light guide plate 110 and the second light guide plate 120, it is necessary to dispose them on the first surface 301 and the second surface 302, and the first strip 511 and the second strip 512 will extend along the sides 111 and 121 of the first light guide plate 110 and the second light guide plate 120 respectively.

In a preferred embodiment, when the first strip 511 and the second strip 512 are disposed side-by-side, the first strip 511 and the second strip 512 can be selectively parallel or vertical to the back plate 300. If the first strip 511 and the second strip 512 are parallel to the back plate 300, it is better for the first light source 501 and the second light source 502 disposed on them to use the lateral lighting design. On the other hand, if the first strip 511 and the second strip 512 are vertical to the back plate 300, it is better for the first light source 501 and the second light source 502 disposed on them to use the top lighting design.

In addition, when the second strip 512 is parallel to the back plate 300, after the second strip 512 penetrates through the through hole 310, the portion of bearing the second light source 502 of the second strip 512 is folded and reversed, and an angle will be formed between the reversed portion and the unfolded portion. At this time, the reversed portion and the unfolded portion will face toward the second surface 302 of the back plate 300 with opposite surface. However, the second light source 502 should be disposed on a surface opposite to the back plate on the reversed portion. The position and times of folds and reversing the second strip 512 can be adjusted according to the position of the second light guide plate 120 to make the second light source 502 distributed on a side of the second light guide plate 120.

If the second strip 512 is vertical to the back plate 300, after the second strip 512 passes through the though hole 310, the second strip 512 should be bent once or several times by using the normal of the second surface 302 of the back plate 300 as the axis to make the second light source 502 bearing portion of the second strip 512 extend along the second light guide plate 120. The position and times of bending the second strip 512 can be adjusted according to the position of the second light guide plate 120 to make the second light source 502 distributed on a side of the second light guide plate 120.

Figure 7D:
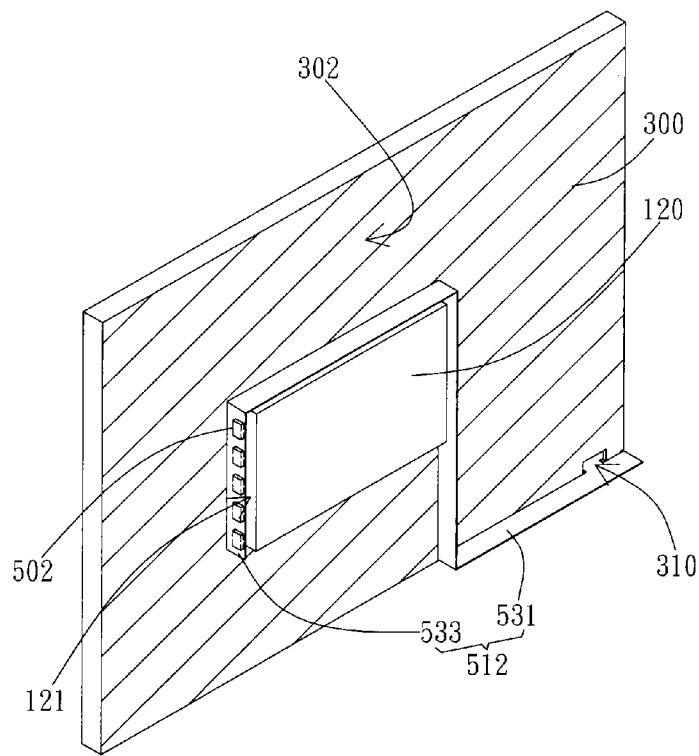
FIG. 7D illustrates a scheme diagram of another embodiment of the second strip.

In a preferred embodiment, the second strip 512 can be formed as a ladder shape by alternatively bending the second strip 512 90° in forward direction and reverse direction. But the second strip 512 can be also formed as a hook shape by continuously bending the second strip 512 in the same direction, as shown in FIG. 7D.

When the first strip 511 and the second strip 512 are disposed in a line, the first strip 511 and the second strip 512 can be also selectively parallel or vertical to the back plate 300. The first light source 501 and the second light source 502 are disposed as the above-mentioned embodiments. If the first strip 511 and the second strip 512 are parallel to the back plate 300, after the strip flexible circuit board 510 passes through the through hole 310, the second strip 512 and the first strip 511 are folded from the connecting position. The following design and bending method used on the second strip 512 can refer to the above-mentioned embodiment using odd or even times folds to match the position of the second light guide plate 120. However, if the first strip 511 and the second strip 512 are vertical to the back plate 300, after the strip flexible circuit board 510 passes through the through hole 310, a first fold and a second fold will be performed on the connecting portion between the first strip 511 and the second strip 512. The first fold changes the relative angle between the first strip 511 and the second strip 512 from 0° to 90°, and the second fold changes the relative angle between the first strip 511 and the second strip 512 from 90° to 180°. Therefore, the first strip 511 and the second strip 512 originally arranged in a line will be arranged side by side and disposed on two sides of the back plate respectively after the first fold and the second fold are performed.

Although the present invention has been illustrated and described with reference to the preferred embodiment thereof, it should be understood that it is in no way limited to the details of such embodiment but is capable of numerous modifications within the scope of the appended claims.

What is claimed is:

1. A backlight module, comprising:
   a back plate having a first surface and a second surface opposite to the first surface, wherein a through hole is formed on the back plate from the first surface to the second surface; and
   a light source module, comprising:
   a strip flexible circuit board having a first strip and a second strip connecting to the first strip;
   a plurality of first light sources disposed on the first strip; and
   a plurality of second light sources disposed on the second strip;
   wherein the strip flexible circuit board is inserted through the through hole, and the first strip and the second strip extend along the first surface and the second surface respectively, the plurality of first light sources and the plurality of second light sources are distributed along the first surface and the second surface respectively.

2. The backlight module of claim 1, further comprising:
   a first light guide plate disposed on the first surface, wherein at least a portion of the first strip and the plurality of first light sources are distributed along a side of the first light guide plate; and
   a second light guide plate disposed on the second surface, wherein at least a portion of the second strip and the plurality of second light sources are distributed along a side of the second light guide plate.

3. The backlight module of claim 2, wherein the second strip comprises a connecting strip and a light source bearing strip connecting to the connecting strip, the plurality of second light sources are disposed on the light source bearing strip, the first strip and the connecting strip of the second strip are arranged side by side and connected by one end, the connecting strip is bent to make the light source bearing strip extend along the side of the second light guide plate.

4. The backlight module of claim 3, wherein the second strip is parallel to the second surface, the bent portion of the connecting strip is folded and reversed to form an angle with respect to the light source bearing strip and face toward the second surface with a reversed surface.

5. The backlight module of claim 4, wherein the second light source is disposed on a surface of the light source bearing strip opposite to the second surface, and the second light source has a light emitting side surface vertical to the surface of the light source bearing strip, the light emitting side surface faces toward the side of the second light guide plate.

6. The backlight module of claim 4, wherein the first strip is parallel to the first surface, the first light source is disposed on a surface of the first strip opposite to the first surface, and the first light source has a light emitting side surface vertical to a surface of the first strip, the light emitting side surface faces toward a side of the first light guide plate.

7. The backlight module of claim 4, wherein the first strip is vertical to the first surface and bent from the connecting strip of the second strip to be vertical to the connecting strip, the first light source is disposed on a surface of the first strip opposite to the first surface, and the first light source has a light emitting top surface parallel to a surface of the first strip, the light emitting top surface faces toward a side of the first light guide plate.

8. The backlight module of claim 3, wherein the second strip is vertical to the second surface, the bent portion of the connecting strip is bent at least once by an axis of normal direction of the second surface, so that the connecting strip and the light source bearing strip are non-collinear, and the connecting strip and the light source bearing strip are vertical to the second surface.

9. The backlight module of claim 8, wherein the connecting strip is bent a plurality of times to make the light source bearing strip parallel to the first strip.

10. The backlight module of claim 8, wherein the second light source is disposed on a surface of the light source bearing strip and faces toward a side of the second light guide plate, and the second light source has a light emitting top surface parallel to the surface of the light source bearing strip, the light emitting top surface faces toward the side of the second light guide plate.

11. The backlight module of claim 8, wherein the first strip is parallel to the connecting strip of the second strip and vertical to the first surface, the first light source is disposed on a surface of the first strip and faces toward a side of the first light guide plate, and the first light source has a light emitting top surface parallel to the surface of the first strip, the light emitting top surface faces toward the side of the first light guide plate.

12. The backlight module of claim 8, wherein the first strip is parallel to the first surface and bent from the connecting strip of the second strip to be vertical to the connecting strip, the first light source is disposed on a surface of the first strip opposite to the first surface, and the first light source has a light emitting side surface vertical to the surface of the first strip, the light emitting side surface faces toward the side of the first light guide plate.

13. The backlight module of claim 2, wherein the first strip and the second strip are arranged in a line, a plurality of lateral folds is generated at a connecting portion of the first strip and the second strip, so that the second strip is reversed and at least one portion of the second strip extends along an extending direction of the first strip.

14. The backlight module of claim 13, wherein the fold of the connecting portion is inserted into and disposed in the through hole.

15. The backlight module of claim 13, wherein the plurality of lateral folds comprises a first fold and a second fold, the first fold forms an angle of 90° between the first strip and the folded second strip, and the second fold make the angle between the first strip and the folded second strip become 180°.

16. The backlight module of claim 13, wherein the first strip is vertical to the first surface, the first light source is disposed on a surface of the first strip and faces toward a side surface of the first light guide plate, and the first light source has a light emitting top surface parallel to the surface of the first strip, the light emitting top surface faces toward the side of the first light guide plate.

17. The backlight module of claim 13, wherein the first strip is parallel to the first surface, the first light source is disposed on a surface of the first strip opposite to the first surface, and the first light source has a light emitting side surface vertical to the surface of the first strip, the light emitting side surface faces toward the side of the first light guide plate.

18. The backlight module of claim 13, wherein the second strip is vertical to the second surface, the second strip is bent at least once by an axis of normal direction of the second surface, so that the plurality of second light sources disposed on the second strip is distributed on the second strip.

19. The backlight module of claim 13, wherein the second strip is parallel to the second surface, the second strip is folded and reversed to form an angle between a portion of the second strip bearing the second light source and other portions and face toward the second surface with a reversed surface.

20. The backlight module of claim 1, wherein the light source module further comprises a connector, the connector has a plurality of terminals connecting to the first light sources and the second light sources respectively.

21. A display device, comprising:
a backlight module of one of claim 1 to claim 20;
a first panel disposed on the first surface of the back plate, wherein the plurality of first light sources and at least a portion of the first strip correspond to a side of the first panel; and
a second panel disposed on the second surface of the back plate, wherein the plurality of second light sources and at least a portion of the second strip correspond to a side of the second panel.

22. A backlight module manufacturing method, comprising steps of:
forming a through hole on a back plate, wherein the back plate has a first surface and a second surface opposite to the first surface, the through hole is formed on the back plate from the first surface to the second surface;
preparing a strip flexible circuit board having a first strip and a second strip connecting to the first strip;
disposing a plurality of first light sources on the first strip;
disposing a plurality of second light sources on the second strip; and
inserting the strip flexible circuit board through the through hole, so that the first strip and the second strip extend along the first surface and the second surface respectively, and the plurality of first light sources and the plurality of second light sources are distributed along the first surface and the second surface respectively.

* * * * *